United States Patent
Lin et al.

(10) Patent No.: US 10,839,005 B2
(45) Date of Patent: Nov. 17, 2020

(54) DYNAMIC GRAPHIC INFORMATION CLASSIFICATION DEVICE AND METHOD

(71) Applicant: AUTOMOTIVE RESEARCH & TESTING CENTER, Lugang (TW)

(72) Inventors: You-Shyan Lin, Lugang (TW); Yi Yan, Lugang (TW)

(73) Assignee: AUTOMOTIVE RESEARCH & TESTING CENTER, Changhua County (TW)

( * ) Notice: Subject to any disclaimer, the term of this patent is extended or adjusted under 35 U.S.C. 154(b) by 0 days.

(21) Appl. No.: 16/231,848

(22) Filed: Dec. 24, 2018

(65) Prior Publication Data

US 2020/0201899 A1   Jun. 25, 2020

(51) Int. Cl.
| | |
|---|---|
| *G06F 16/55* | (2019.01) |
| *G01C 21/34* | (2006.01) |
| *G01C 21/32* | (2006.01) |
| *G01C 21/36* | (2006.01) |

(52) U.S. Cl.
CPC ............ *G06F 16/55* (2019.01); *G01C 21/32* (2013.01); *G01C 21/3492* (2013.01); *G01C 21/367* (2013.01)

(58) Field of Classification Search
CPC ..... G06F 16/55; G01C 21/32; G01C 21/3492; G01C 21/367
See application file for complete search history.

(56) References Cited

U.S. PATENT DOCUMENTS

| | | | | |
|---|---|---|---|---|
| 7,739,037 | B2* | 6/2010 | Sumizawa | G01C 21/32 |
| | | | | 701/439 |
| 9,699,289 | B1* | 7/2017 | Kamata | H04B 1/3822 |
| 9,733,085 | B2* | 8/2017 | Stahlin | G08G 1/0112 |
| 2017/0301235 | A1* | 10/2017 | Endo | G06K 9/00791 |
| 2018/0113474 | A1* | 4/2018 | Koda | G05D 1/0274 |
| 2018/0188037 | A1* | 7/2018 | Wheeler | H04L 67/18 |
| 2020/0139979 | A1* | 5/2020 | Kawanai | G01C 21/3407 |

FOREIGN PATENT DOCUMENTS

| | | | |
|---|---|---|---|
| EP | 1975563 B1 * | 10/2017 | |
| WO | WO-2017051478 A1 * | 3/2017 | ............... G08G 1/00 |

* cited by examiner

*Primary Examiner* — Hunter B Lonsberry
*Assistant Examiner* — Elizabeth Yang
(74) *Attorney, Agent, or Firm* — Muncy, Geissler, Olds & Lowe, P.C.

(57) ABSTRACT

A dynamic graphic information classification device which is installed in a vehicle and comprises at least one automatic driving assistant system, a wireless communication interface, a storage device, a GPS module, and a processor. The wireless communication interface is connected with a cloud server where a high definition map and 3D point cloud map information are stored. The GPS module acquires position coordinates of the vehicle from an electronic map. The storage device stores at least one of at least one road curvature and at least one crossroads feature of a road environment of a predetermined driving path of the vehicle. The processor classifies the map information to be downloaded according to at least one of at least one road curvature and at least one crossroads feature and an automatic driving level of the automatic driving assistant system, whereby to reduce the time for download.

10 Claims, 6 Drawing Sheets

DYNAMIC GRAPHIC INFORMATION CLASSIFICATION DEVICE AND METHOD

BACKGROUND OF THE INVENTION

Field of the Invention

The present invention relates to a classification technology, particularly to a dynamic graphic information classification device and method.

Description of the Related Art

Driving safety is a critical factor for autonomous vehicles. The traditional digital navigation graphic information has been unable to satisfy requirement of autonomous vehicles. An autonomous vehicle needs a high definition electronic map to acquire the road environment information and its position information along the driving path. Further, 3D point cloud graphic information is also necessary for guaranteeing driving safety.

The function of a high definition electronic map is to provide the autonomous vehicle with road information, such as lane markers, traffic lights, road curvatures, etc. These road characteristics facilitate the autonomous vehicle to estimate the position thereof. However, the high definition electronic map still has a disadvantage: it cannot precisely determine the position of a vehicle unless it cooperates with another positioning technology. For example, 3D point cloud graphic information must cooperate with a simultaneous localizing and mapping (SLAM) technology to determine the position of a vehicle and establish the map simultaneously. Although the high definition electronic map and the 3D point cloud graphic information can provide abundant and accurate road environment information, the data volume thereof makes the transmission thereof unstable and the download thereof consume longer time in the current 4G environment. However, only a little bit of delay may make the system generate incorrect judgment and cause a serious traffic accident. Accordingly, the present invention proposes a dynamic graphic information classification device and method to overcome the abovementioned problems.

SUMMARY OF THE INVENTION

The primary objective of the present invention is to provide a dynamic graphic information classification device and method. As the high definition map information and 3D point cloud map information has bulky data volume, the storage device of the dynamic graphic information classification device installed in the vehicle is unable to store all the information. Thus, the information is stored in a cloud server and allowed to be downloaded to the vehicle. According to at least one of the road curvature and the crossroads features of the road environment and the automatic driving level of the automatic driving assistant system, the device of the present invention determines the grade of the map information needing to be downloaded. Then, the device of the present invention asks to the cloud server to download local map information including road environment according to the position and speed of the vehicle. Therefore, the data volume of the downloaded local map information is reduced while the road environment is simpler. Further, the local map information can be downloaded in advance while the road environment is more complicated.

In order to achieve the abovementioned objective, the present invention proposes a dynamic graphic information classification device, which is installed in a vehicle, and which comprises at least one automatic driving assistant system, a wireless communication interface, a storage device, a GPS (Global Positioning System) module, and a processor. The GPS module obtains the position coordinates from an electronic map. The processor is electrically connected with the GPS module. The processor works out a predetermined driving path on the electronic map according to the destination and the position coordinates. The vehicle runs along the predetermined driving path. The road environment of the predetermined driving path includes at least one of at least one road curvature and at least one crossroads feature. The automatic driving assistant system is electrically connected with the processor. The wireless communication interface is electrically connected with the processor and linked to a cloud server through a wireless network. The cloud server stores a high definition map (HD Map) and 3D point cloud map information. The storage device is electrically connected with the processor and stores the electronic map and at least one of at least one road curvature and at least one crossroads feature. Before the processor detects that the vehicle reaches the road environment including at least one of at least one road curvature and at least one crossroads feature using the GPS module, the processor classifies the high definition map and the 3D point cloud map information through the wireless communication interface according to at least one of at least one road curvature and at least one crossroads feature and the automatic driving level of the automatic driving assistant system, and then finds and downloads the local map information corresponding to the road environment from the high definition map or the 3D point cloud map information.

The present invention also proposes a dynamic graphic information classification method, which comprises steps: using the destination and the position coordinates of a vehicle to work out a predetermined driving path on an electronic map, wherein the vehicle runs along the predetermined driving path, and wherein the road environment of the predetermined driving path includes at least one of at least one road curvature and at least one crossroads feature; storing at least one of at least one road curvature and at least one crossroads feature; before the vehicle reaches the road environment including at least one of at least one road curvature and at least one crossroads feature, classifying the high definition map and the 3D point cloud map information, which are stored in a cloud server, according to at least one of at least one road curvature and at least one crossroads feature and the automatic driving level of the automatic driving assistant system installed in the vehicle; and finding and downloading the local map information corresponding to the road environment from the high definition map or the 3D point cloud map information.

Below, embodiments are described in detail in cooperation with the attached drawings to make easily understood the characteristics and accomplishments of the present invention.

DETAILED DESCRIPTION OF THE INVENTION

The present invention will be described in detail with embodiments and attached drawings below. Similar or identical elements are denoted with similar or identical symbols in the drawings. In the drawings, the shapes or thicknesses may be exaggerated intentionally to make presentation simpler and labeling easier. The elements that are well known by the persons skilled in the art are not necessarily described in the specification or depicted in the drawings. Further, the persons having ordinary knowledge in the field should be able to make modification or variation according to the specification of the present invention. However, it should be noted: any modification or variation made according to the spirit or technical contents disclosed in the specification of the present invention is to be also included by the scope of the present invention.

Figure 1:
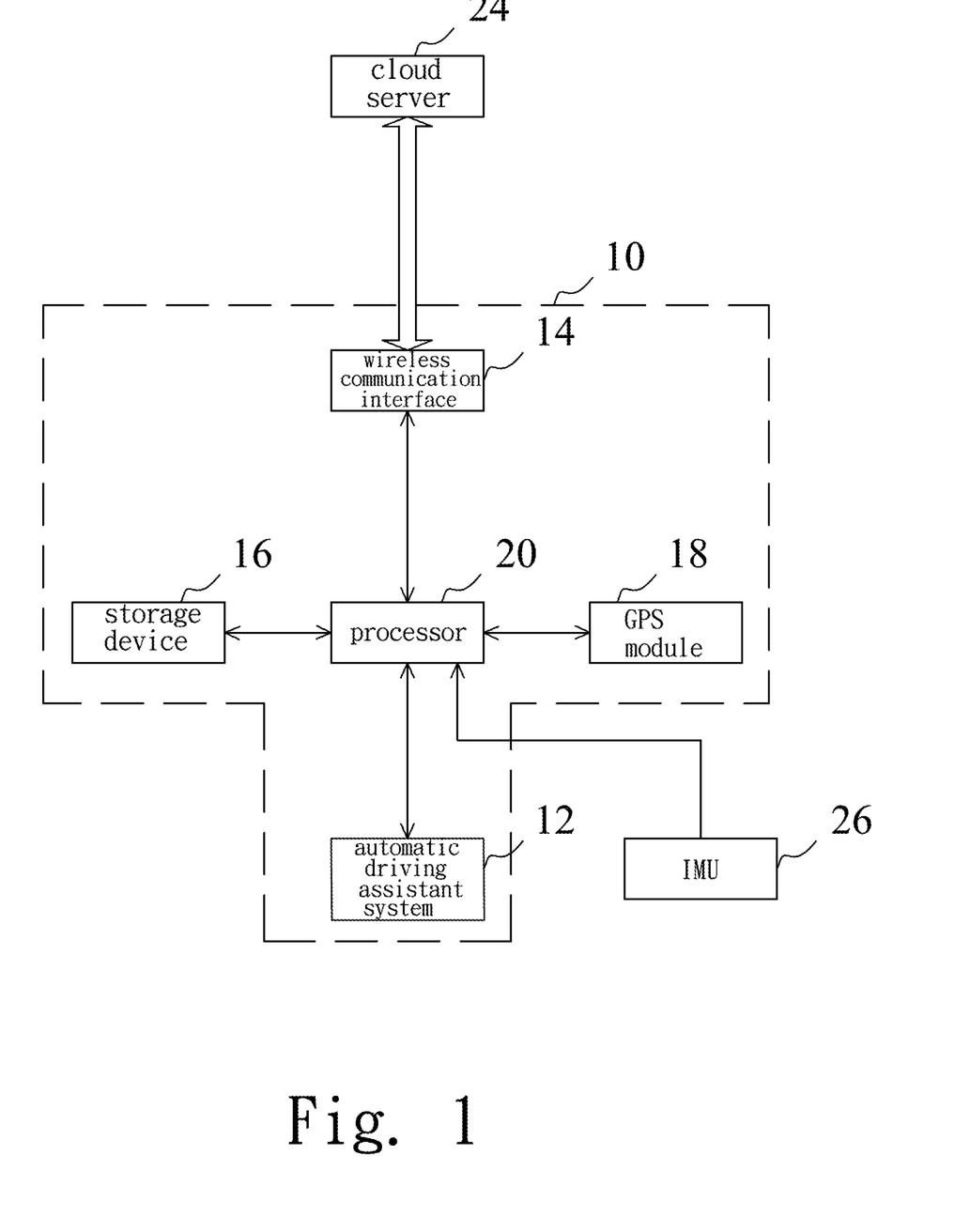
FIG. 1 is a block diagram schematically showing the architecture of a dynamic graphic information classification device according to one embodiment of the present invention.
Figure 2:
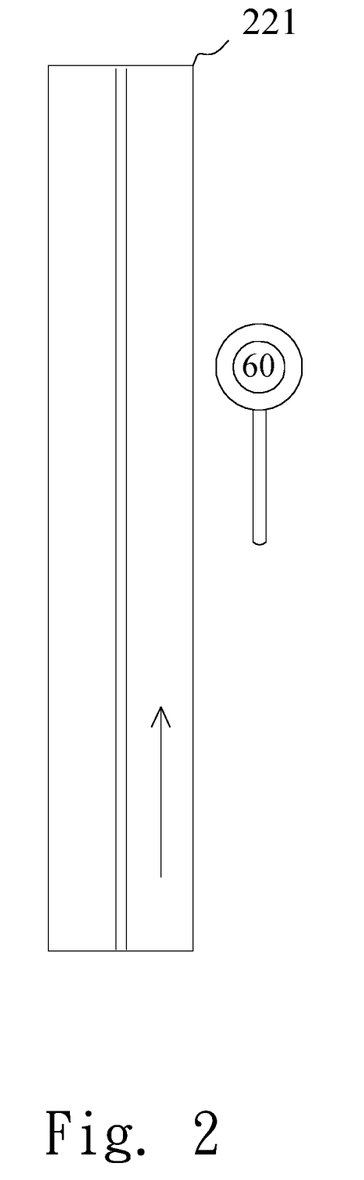
FIG. 2 is a diagram schematically showing a straight road of the present invention.
Figure 3:
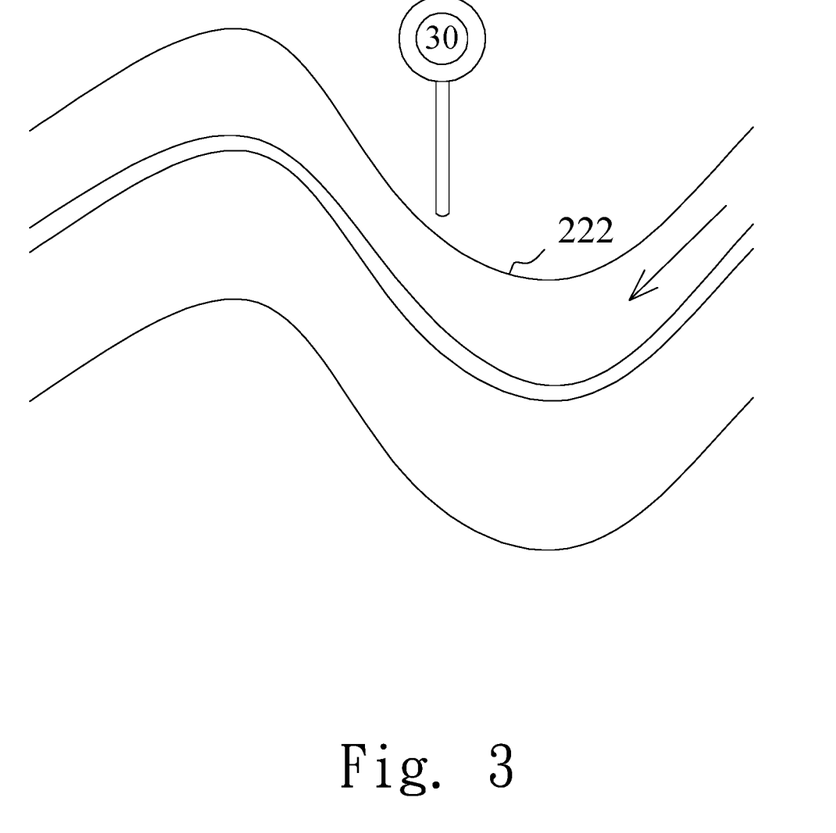
FIG. 3 is a diagram schematically showing a curved road of the present invention.
Figure 4:
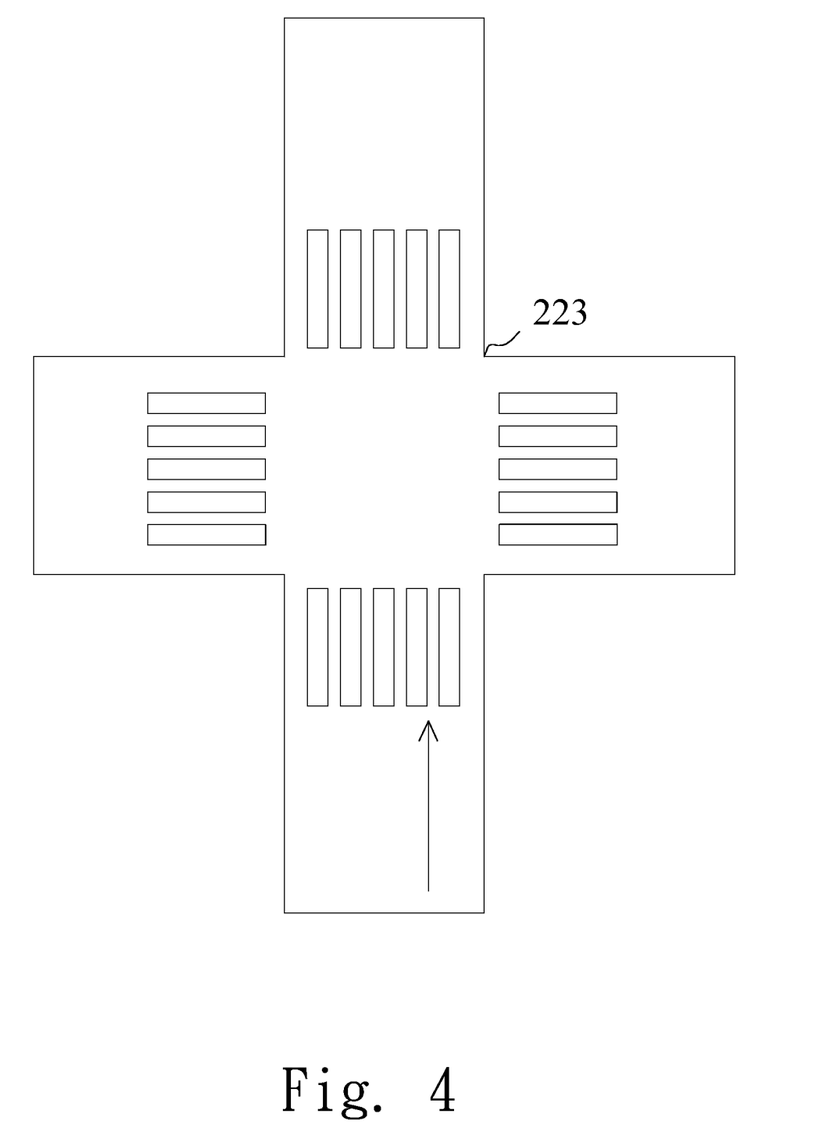
FIG. 4 is a diagram schematically showing a crossroads of the present invention.

Refer to FIGS. 1-4. FIG. 2 is a diagram schematically showing a straight road. FIG. 3 is a diagram schematically showing a curved road. FIG. 4 is a diagram schematically showing a crossroads. Below is introduced a dynamic graphic information classification device 10 of the present invention. The dynamic graphic information classification device 10 is installed in a vehicle. The dynamic graphic information classification device 10 comprises at least one automatic driving assistant system 12, a wireless communication interface 14, a storage device 16, a GPS (Global Positioning System) module 18, and a processor 20. Herein, a single automatic driving assistant system is used to exemplify the at least one automatic driving assistant system 12. The automatic driving assistant system 12 may be a lane changing system (LCS), a lane keeping system (LKS), an autonomous emergency braking (AEB) system, a lane-following system (LFS), or an adaptive cruise control (ACC) system. The GPS module 18 acquires the position coordinates of the vehicle from an electronic map. The processor 20 is electrically connected with the GPS module 18. The processor 20 works out a predetermined driving path on the electronic map according to the destination and position coordinates of the vehicle. The vehicle runs along the predetermined driving path. A road environment 221, 222, or 223 of the predetermined driving path includes at least one of at least one road curvature and at least one crossroads feature. The automatic driving assistant system 12 is electrically connected with the processor 20. The wireless communication interface 14 is electrically connected with the processor 20 and linked to a cloud server 24 through a wireless network. The cloud server 24 stores a high definition map (HD Map) and 3D point cloud map information. As the high definition map information and the 3D point cloud map information has bulky data volume, the storage device 16 of the dynamic graphic information classification device 10 is unable to store all the information. Thus, the information is stored in the cloud server 24 and allowed to be download to the vehicle. The storage device 16 is electrically connected with the processor 20 and stores the electronic map and at least one of at least one road curvature and at least one crossroads feature. The processor 20 may download the at least one of the road curvatures and the crossroads features from the high definition map in the cloud server 24 through the wireless communication interface 14. However, the present invention does not limit that the road curvature and/or crossroads feature must be downloaded from the cloud server 24. In one embodiment, the electronic map stored in the storage device 16 includes at least one of at least one road curvature and at least one crossroads feature. Before the processor 20 detects that the vehicle reaches the road environment 221, 222, or 223 including at least one of at least one road curvature and at least one crossroads feature using the GPS module 18, the processor 20 classifies the high definition map and the 3D point cloud map information through the wireless communication interface 14 according to at least one of at least one road curvature and at least one crossroads feature and the automatic driving level of the automatic driving assistant system 12, and then finds and downloads the local map information corresponding to the road environment 221, 222, or 223 from the high definition map or the 3D point cloud map information.

The processor 20 is also electrically connected with an inertia measurement unit (IMU) 26. The processor 20 uses the wireless communication interface 14 to acquire the internet speed and the data volume of the local map information, uses the IMU 26 to acquire the speed of the vehicle, and uses the GPS module 18 to acquire the longitude and latitude of the road environment 221, 222, or 223. Then, the processor 20 determines the time point to download the local map information according to the position coordinates of the vehicle, the abovementioned longitude and latitude, the speed of the vehicle, the internet speed, and the data volume of the local map information. Suppose that the data volume of the local map information is 50 Mb, the speed of the vehicle is 45 km/hr, and the internet speed is 20 Mb/sec. The processor 20 determines the time point to download the local map information according to the abovementioned parameters and then asks the cloud server 24 for downloading the local map information through the wireless communication interface 14 at the time point. It is learned from the abovementioned conditions: downloading the local map information needs 2.5 seconds and the vehicle runs 12.5 m per second. Therefore, the vehicle cannot download the complete local map information unless it starts download at the position 31.25 m before the road environment 221, 222, or 223 including at least one of the road curvature and the crossroads features. Thus, while the road environment 221, 222, or 223 is more complicated, the local map information may be downloaded in advance; while the road environment 221, 222, or 223 is simpler, the data volume of the downloaded local map information is reduced.

The automatic driving assistant system 12 may have a low, medium or high level of driving automation. The Society of Automotive Engineers (SAE) classifies vehicle automation into 6 levels, including Level 0: no automation; Level 1: driver assistance; Level 2: partial automation; Level 3: conditional automation; Level 4: high automation; and Level 5: full automation. The low level driving automation in the present invention is corresponding to Level 1 (driver assistance) in SAE classification; the medium level driving automation is corresponding to Level 2 (partial automation) or Level 3 (conditional automation); the high level driving automation is corresponding to Level 4 (high automation) or Level 5 (full automation). In general, the automatic driving assistant system 12 of the low level driving automation needs lane marker information and road curvature information; in comparison with the low level driving automation, the automatic driving assistant system 12 of the medium level driving automation needs relatively more information and provides more time for the driver to respond to danger; the automatic driving assistant system 12 of the high level driving automation needs a high precision map system.

Refer to FIGS. 1-5. Below is introduced a dynamic graphic information classification method used by the dynamic graphic information classification device of the present invention. The method of the present invention comprises Steps S10-S16. In Step S10, the processor 20 uses the position coordinates and destination of the vehicle to work out a predetermined driving path on an electronic map. In Step S12, the processor 20 downloads at least one of at least one road curvature and at least one crossroads feature from the high definition map in the cloud server 24 through the wireless communication interface 14 and stores at least one of at least one road curvature and at least one crossroads feature to the storage device 16. In addition to being downloaded from the cloud server 24, at least one of at least one road curvature and at least one crossroads feature may also be built in the electronic map of the vehicle. In Step S14, before the processor 20 detects that the vehicle reaches the road environment 221, 222, or 223 including at least one of at least one road curvature and at least one crossroads feature using the GPS module 18, the processor 20 classifies the high definition map and the 3D point cloud map information through the wireless communication interface 14 according to at least one of at least one road curvature and at least one crossroads feature and the automatic driving level of the automatic driving assistant system 12, and then finds and downloads the local map information corresponding to the road environment 221, 222, or 223 from the high definition map or the 3D point cloud map information. The local map information may have different grades. The higher grade local map information has larger data volume and thus must be downloaded earlier in advance. The lower grade local map information has smaller data volume and can be downloaded while the vehicle is going to reach the crossroads feature. In any case, the download of the local map information must be completed before the vehicle reaches the road environment 221, 222, or 223.

Figure 5:
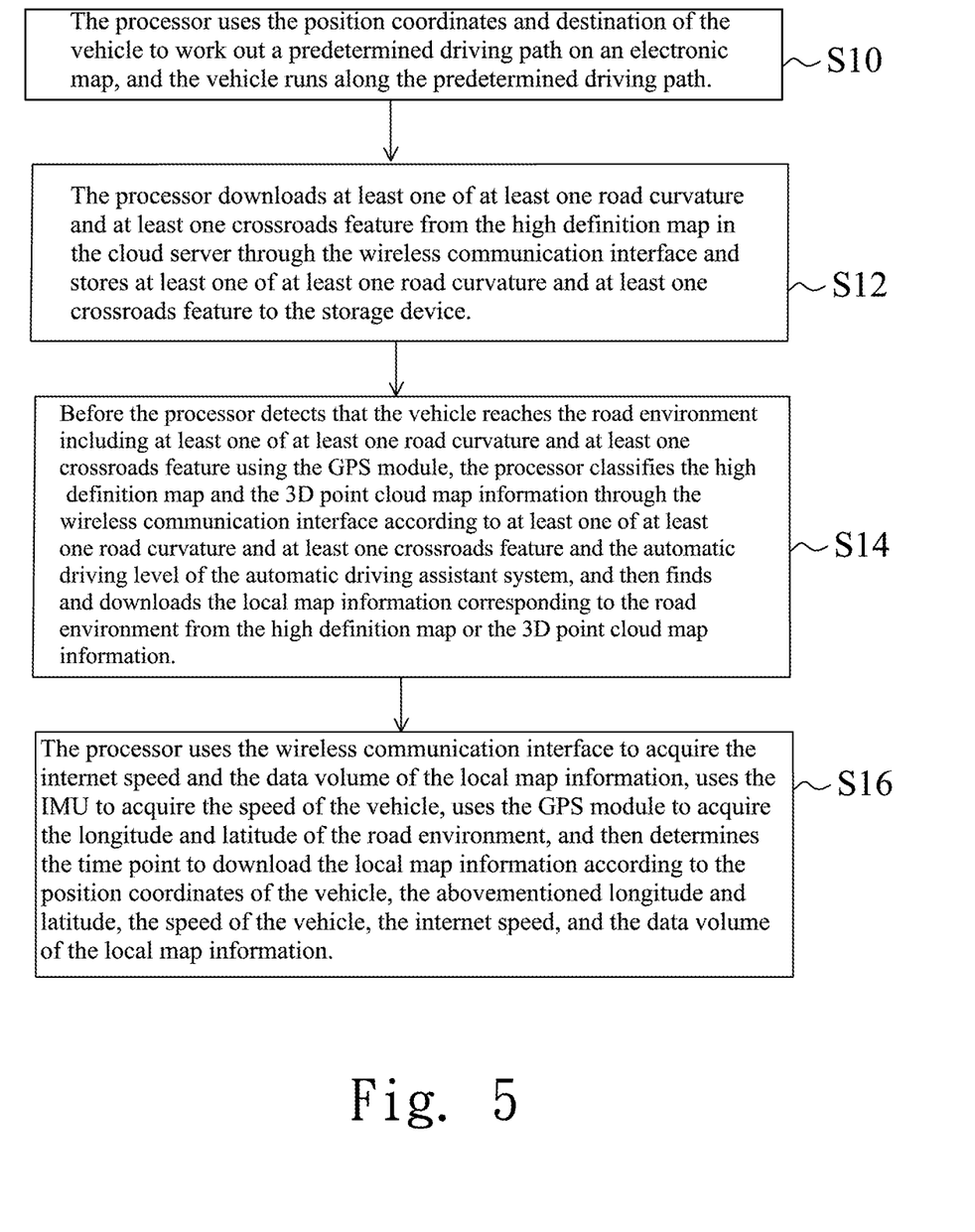
FIG. 5 is a flowchart of a dynamic graphic information classification method according to one embodiment of the present invention.

After Step S14, Step S16 can be undertaken optionally. In Step S16, the processor 20 uses the wireless communication interface 14 to acquire the internet speed and the data volume of the local map information, uses the IMU 26 to acquire the speed of the vehicle, uses the GPS module 18 to acquire the longitude and latitude of the road environment 221, 222, or 223, and then determines the time point to download the local map information according to the position coordinates of the vehicle, the abovementioned longitude and latitude, the speed of the vehicle, the internet speed, and the data volume of the local map information.

Below is introduced the classification of the high definition map and the 3D point cloud map information. Refer to Table. 1 and FIG. 6.

TABLE 1

Figure 6:
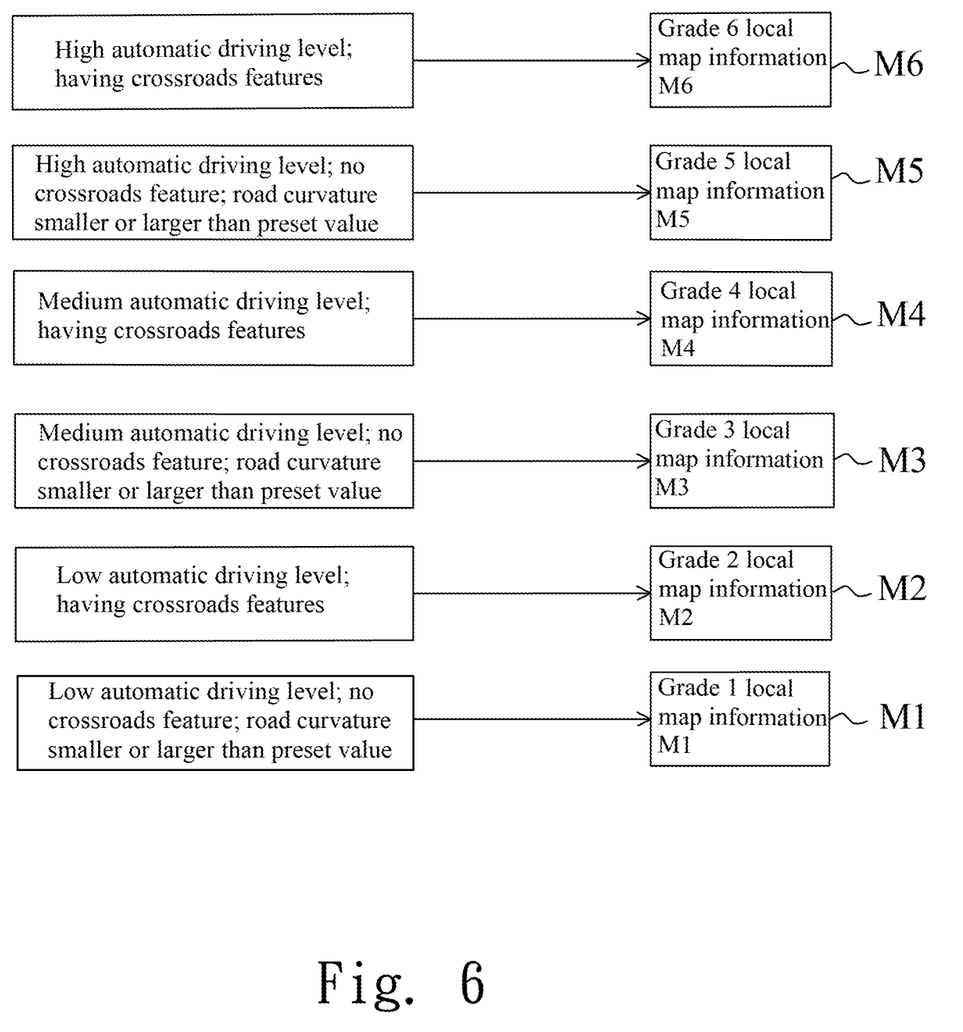
FIG. 6 is a block diagram for summarizing Table. 1 of the present invention.

| Automatic driving level | Crossroads feature and road curvature | Grade of local map information | Contents of map information |
|---|---|---|---|
| Low | Having crossroads features | Grade 2 | HD map information (crossroads features including traffic lights, zebra markings, or stop lines) |
| Low | No crossroads feature; road curvature smaller than preset value | Grade 1 | HD map information (lane attributes including road curvatures, lane markers, speed limits, and quantity of lanes) |
| Low | No crossroads feature; road curvature larger than preset value | Grade 1 | HD map information (lane attributes including road curvatures, lane markers, speed limits, and quantity of lanes) |
| Medium | Having crossroads features | Grade 4 | HD map information (lane attributes, crossroads features, and dynamic attributes; crossroads features including traffic lights, zebra markings, or stop lines; lane attributes including road curvatures, lane markers, speed limits, and quantity of lanes) |
| Medium | No crossroads feature; road curvature smaller than preset value | Grade 3 | HD map information (lane attributes, and dynamic attributes; lane attributes including road curvatures, lane markers, speed limits, and quantity of lanes; dynamic attributes including weather, rate of traffic flow, accidents, . . . ) |
| Medium | No crossroads feature; road curvature larger than preset value | Grade 3 | HD map information (lane attributes, and dynamic attributes; lane attributes including road curvatures, lane markers, speed limits, and quantity of lanes; dynamic attributes including weather, rate of traffic flow, accidents, . . . ) |
| High | Having crossroads features | Grade 6 | HD map information (lane attributes, crossroads features, dynamic attributes, the crossroads features including traffic lights, zebra markings, or stop lines; the lane attributes including road curvatures, lane markers, speed limits, and quantity of lanes) and 3D point cloud map information. |
| High | No crossroads feature; road curvature smaller than preset value | Grade 5 | HD map information (lane attributes, dynamic attributes, the lane attributes including road curvatures, lane markers, speed limits, and quantity of lanes; the dynamic attributes including weather, rate of traffic flow, accidents, . . . ) and 3D point cloud map information. |
| High | No crossroads feature; road curvature larger than preset value | Grade 5 | HD map information (lane attributes, dynamic attributes; the lane attributes including road curvatures, lane markers, speed limits, and quantity of lanes; the dynamic attributes including weather, rate of traffic flow, accidents, . . . ) and 3D point cloud map information. |

While the vehicle is equipped with a low level automatic driving system, and before the vehicle reaches the road environment 223 having the crossroads features shown in FIG. 4, the local map information comprises the Grade 2 local map information M2 of HD map information which are crossroads features, such as traffic lights, zebra markings, or stop lines. While the vehicle is equipped with a low level automatic driving system, and before the vehicle reaches the road environment 221, 222, or 223 not having any crossroads feature but has a road curvature smaller than a preset value, the local map information comprises Grade 1 local map information M1 of HD map information which are lane attributes, such as road curvatures, lane markers, speed limits, and quantity of lanes, wherein the crossroads features includes traffic lights, zebra markings, or stop lines. The road curvature in this case is shown in FIG. 2, indicating a straight road. While the vehicle is equipped with a low level automatic driving system, and before the vehicle reaches the road environment 221, 222, or 223 not having any crossroads feature but has a road curvature larger than a preset value, the local map information comprises the Grade 1 local map information M1 of HD map information which are lane attributes, such as road curvatures, lane markers, speed limits, and quantity of lanes. The road curvature in this case is shown in FIG. 3, indicating a curved road. The above-mentioned lane attributes may be at least one of road curvatures, lane markers, speed limits, and quantity of lanes. However, the present invention does not particularly limit the contents of lane attributes. For example, while the automatic driving assistant system 12 is a lane changing system (LCS), the lane attributes include road curvatures, lane markers, and speed limits; while the automatic driving assistant system 12 is a lane-following system (LFS), the lane attributes include lane markers, road curvatures, and speed limits; while the automatic driving assistant system 12 is a lane changing system (LCS), the lane attributes include road curvatures, lane markers, speed limits, and quantity of lanes; while the automatic driving assistant system 12 is an adaptive cruise control (ACC) system, the lane attributes include road curvatures, lane markers, and speed limits; while the automatic driving assistant system 12 is an autonomous emergency braking (AEB) system, the lane attributes include speed limits. While the vehicle is equipped with a medium level automatic driving system, and before the vehicle reaches the road environment 223 having the crossroads features shown in FIG. 4, the local map information comprises the Grade 4 local map information M4 of HD map information which are lane attributes, crossroads features, and dynamic attributes, wherein the crossroads features include traffic lights, zebra markings, or stop lines; the lane attributes include road curvatures, lane markers, speed limits, and quantity of lanes; the dynamic attributes include weather, rate of traffic flow, accidents, traffic jams, emergency rescues, road constructions, dropped objects, holes, and abnormal traffic lights. While the vehicle is equipped with a medium level automatic driving system, and before the vehicle reaches the road environment 221, 222, or 223 not having any crossroads feature but has a road curvature smaller than a preset value, the local map information comprises the Grade 3 local map information M3 of HD map information which are lane attributes and dynamic attributes, wherein the lane attributes include road curvatures, lane markers, speed limits, and quantity of lanes; the dynamic attributes include weather, rate of traffic flow, accidents, traffic jams, emergency rescues, road constructions, dropped objects, holes, and abnormal traffic lights. The road curvature in this case is shown in FIG. 2, indicating a straight road. While the vehicle is equipped with a medium level automatic driving system, and before the vehicle reaches the road environment 221, 222, or 223 not having any crossroads feature but has a road curvature larger than a preset value, the local map information comprises the Grade 3 local map information M3 of HD map information which are lane attributes and dynamic attributes, wherein the lane attributes include road curvatures, lane markers, speed limits, and quantity of lanes; the dynamic attributes include weather, rate of traffic flow, accidents, traffic jams, emergency rescues, road constructions, dropped objects, holes, and abnormal traffic lights. The road curvature in this case is shown in FIG. 3, indicating a curved road.

While the vehicle is equipped with a high level automatic driving system, and before the vehicle reaches the road environment 223 having the crossroads features shown in FIG. 4, the local map information is the Grade 6 local map information M6 including lane attributes, crossroads features, dynamic attributes, and 3D point cloud map information, and a simultaneous localization and mapping (SLAM) technology is used to determine the position of the vehicle, wherein the crossroads features include traffic lights, zebra markings, or stop lines; the lane attributes include road curvatures, lane markers, speed limits, and quantity of lanes. While the vehicle is equipped with a high level automatic driving system, and before the vehicle reaches the road environment 221, 222, or 223 not having any crossroads feature but has a road curvature smaller than a preset value, the local map information comprises the Grade 5 local map information M5 of HD map information which are lane attributes, dynamic attributes, and 3D point cloud map information, wherein the lane attributes include road curvatures, lane markers, speed limits, and quantity of lanes; dynamic attributes including weather, rate of traffic flow, accidents, . . . . The road curvature in this case is shown in FIG. 2, indicating a straight road. While the vehicle is equipped with a high level automatic driving system, and before the vehicle reaches the road environment 221, 222, or 223 not having any crossroads feature but has a road curvature larger than a preset value, the local map information comprises the Grade 5 local map information M5 of HD map information which are lane attributes, dynamic attributes, and 3D point cloud map information, wherein the lane attributes include road curvatures, lane markers, speed limits, and quantity of lanes; the dynamic attributes include weather, rate of traffic flow, accidents, traffic jams, emergency rescues, road constructions, dropped objects, holes, and abnormal traffic lights. The road curvature in this case is shown in FIG. 3, indicating a curved road.

In conclusion, the present invention classifies the high definition map and 3D point cloud map information according to at least one of the road curvature and the crossroads feature of the road environment and the automatic driving level of the automatic driving assistant system to let different grades of local map information be downloaded corresponding to different conditions, whereby to reduce the data volume of the downloaded local map information and decrease the time of downloading the local map information.

The embodiments described above are only to exemplify the present invention but not to limit the scope of the present invention. Any equivalent modification or variation according to the shapes, structures, characteristics and spirit disclosed in the specification is to be also included by the scope of the present invention.

What is claimed is:

1. A dynamic graphic information classification device, which is installed in a vehicle, the dynamic graphic information classification device comprising:
a GPS (Global Positioning System) module that is configured to acquire position coordinates of said vehicle from an electronic map;
a processor that is electrically connected with said GPS module and that is configured to work out a predetermined driving path on said electronic map according to a destination and said position coordinates of said vehicle, wherein said vehicle is configured to run along said predetermined driving path, and wherein a road environment of said predetermined driving path includes at least one of at least one road curvature and at least one crossroads feature;
at least one automatic driving assistant system that is electrically connected with said processor and that is pre-configured to a predetermined automatic driving level;
a wireless communication interface electrically connected with said processor and wirelessly linked to a cloud server via a wireless network, wherein said cloud server is configured to store different grades of a high definition map and 3D point cloud map information; and
a storage device that is electrically connected with said processor and that is configured to store said electronic map and at least one of said at least one road curvature and said at least one crossroads feature, wherein
before said processor detects that said vehicle reaches said road environment including at least one of said at least one road curvature and said at least one crossroads feature using said GPS module, said processor is configured to select one of the different grades of said high definition map and said 3D point cloud map information via said wireless communication interface based on the predetermined automatic driving level of said automatic driving assistant system and at least one of said at least one road curvature and said at least one crossroads feature, and then to find and download local map information corresponding to said road environment from the selected one of the different grades of said high definition map or said 3D point cloud map information.

2. The dynamic graphic information classification device according to claim 1, wherein said processor is configured to use said wireless communication interface to download at least one of said at least one road curvature and said at least one crossroads feature from said high definition map in said cloud server.

3. The dynamic graphic information classification device according to claim 1, wherein said electronic map stored in said storage device includes at least one of said at least one road curvature and said at least one crossroads feature.

4. The dynamic graphic information classification device according to claim 2, wherein
said processor is also electrically connected with an inertia measurement unit (IMU);
said processor is configured to use said wireless communication to acquire an internet speed and a data volume of said local map information, to use said inertia measurement unit to acquire a speed of said vehicle, and to use said GPS module to acquire a longitude and a latitude of said road environment; and
then, said processor is configured to determine a time point to download said local map information according to said position coordinates of said vehicle, said longitude and said latitude, said speed of said vehicle, said internet speed, and said data volume of said local map information.

5. The dynamic graphic information classification device according to claim 3, wherein
said processor is also electrically connected with an inertia measurement unit (IMU);
said processor is configured to use said wireless communication to acquire an internet speed and a data volume of said local map information, to use said inertia measurement unit to acquire a speed of said vehicle, and to use said GPS module to acquire a longitude and a latitude of said road environment; and
then, said processor is configured to determine a time point to download said local map information according to said position coordinates of said vehicle, said longitude and said latitude, said speed of said vehicle, said internet speed, and said data volume of said local map information.

6. A dynamic graphic information classification method for an automatic driving assistant system installed in a vehicle, the automatic driving assistant system being pre-configured to a predetermined automatic driving level, the method comprising steps:
providing a cloud server that is configured to store different grades of a high definition map and 3D point cloud map information;
using a destination and position coordinates of a vehicle to work out a predetermined driving path on an electronic map, wherein said vehicle runs along said predetermined driving path; a road environment of said predetermined driving path includes at least one of at least one road curvature and at least one crossroads feature;
storing, in a storage device of the vehicle, at least one of said at least one road curvature and said at least one crossroads feature; and
before said vehicle reaches said road environment including at least one of said at least one road curvature and said at least one crossroads feature, selecting one of the different grades of said high definition map and 3D point cloud map information stored in the cloud server based on an automatic driving level of an automatic driving assistant system installed in said vehicle and at least one of said at least one road curvature and said at least one crossroads feature; and finding and downloading local map information corresponding to said road environment from the selected one of the different grades of said high definition map or said 3D point cloud map information.

7. The dynamic graphic information classification method according to claim 6, wherein at least one of said at least one road curvature and said at least one crossroads feature is stored in said electronic map.

8. The dynamic graphic information classification method according to claim 6, wherein at least one of said at least one road curvature and said at least one crossroads feature is downloaded from said cloud server and then stored.

9. The dynamic graphic information classification method according to claim 7, wherein
after classifying said high definition map and said 3D point cloud map information stored in said cloud server, a speed of said vehicle, an internet speed, a data volume of said local map information, a longitude and a latitude of said road environment are acquired; and
then, a time point to download said local map information is determined according to said position coordinates of said vehicle, said longitude and said latitude, said speed of said vehicle, said internet speed, and said data volume of said local map information.

10. The dynamic graphic information classification method according to claim 8, wherein
after classifying said high definition map and said 3D point cloud map information stored in said cloud server, a speed of said vehicle, an internet speed, a data volume of said local map information, a longitude and a latitude of said road environment are acquired; and
then, a time point to download said local map information is determined according to said position coordinates of said vehicle, said longitude and said latitude, said speed of said vehicle, said internet speed, and said data volume of said local map information.

* * * * *